US012730244B2

(12) United States Patent
Watson

(10) Patent No.: US 12,730,244 B2
(45) Date of Patent: Sep. 8, 2026

(54) PIR SENSING CIRCUIT FOR A CONSUMER ELECTRONIC DEVICE

(71) Applicant: Sky CP Limited, Isleworth (GB)

(72) Inventor: Jemma Watson, Isleworth (GB)

(73) Assignee: Sky CP Limited, Isleworth (GB)

( * ) Notice: Subject to any disclaimer, the term of this patent is extended or adjusted under 35 U.S.C. 154(b) by 221 days.

(21) Appl. No.: 18/697,390

(22) PCT Filed: Sep. 29, 2022

(86) PCT No.: PCT/GB2022/052474

§ 371 (c)(1),
(2) Date: Mar. 29, 2024

(87) PCT Pub. No.: WO2023/052775

PCT Pub. Date: Apr. 6, 2023

(65) Prior Publication Data

US 2024/0393493 A1 Nov. 28, 2024

(30) Foreign Application Priority Data

Sep. 30, 2021 (GB) .................................... 2114027

(51) Int. Cl.
*G01V 8/00* (2006.01)
*G01V 8/10* (2006.01)

(52) U.S. Cl.
CPC .................................... *G01V 8/10* (2013.01)

(58) Field of Classification Search
CPC .................................. G01V 8/10; H02J 9/005
See application file for complete search history.

(56) References Cited

U.S. PATENT DOCUMENTS 5,936,391 A 8/1999 Larsen et al.
2018/0052055 A1* 2/2018 Ikeda ........................ G01J 1/02

FOREIGN PATENT DOCUMENTS

CN 202267540 U 6/2012
CN 202268864 U 6/2012
(Continued)

OTHER PUBLICATIONS

International Search Report and Written Opinion dated Dec. 13, 2022, in connection with Int'l App. No. PCT/GB2022/052474 (11 pages).

(Continued)

*Primary Examiner* — Dani Fox
(74) *Attorney, Agent, or Firm* — McCarter & English, L.L.P

(57) ABSTRACT

A consumer electronic device includes a low power. e.g. pyroelectric, sensor (8) arranged to detect the presence of a person (6), to switch from standby to full power mode. The sensor (8) may output a small analogue signal which is input to a microcontroller (7) for amplification and digital conversion. The microcontroller (7) is configured to supply power to the sensor (8), for example by configuring an integrated reference voltage source as an input to an integrated operational amplifier which is used to supply power to the sensor. This provides a stable low power supply, thereby reducing noise and false triggering of the sensor. Also, there may be no need to provide an additional power supply for the sensor, so reducing the number of components required and allowing for a low-cost and compact sensing circuit (5).

9 Claims, 5 Drawing Sheets

(56) References Cited

FOREIGN PATENT DOCUMENTS

| | | | |
|---|---|---|---|
| EP | 3276314 | A1 | 1/2018 |
| JP | 2013088427 | A | 5/2013 |

OTHER PUBLICATIONS

Combined Search and Examination Report dated Jun. 21, 2022, in connection with UK Application No. GB2114027.2 (9 pages).
Examination Report dated Nov. 14, 2022, issued in connection with UK Application No. GB2114027.2 (4 pages).
HY11P41 Datasheet for 8-Bit RISC-like Mixed Signal Microcontroller, v.13, HYCON Technology Corp., copyright 2011-2014 (41 pages).

* cited by examiner

PIR SENSING CIRCUIT FOR A CONSUMER ELECTRONIC DEVICE

RELATED APPLICATIONS

The present application is a U.S. National Phase Application under 35 U.S.C. § 371 of International Application No. PCT/GB2022/052474 filed on Sep. 29, 2022, which claims the benefit of United Kingdom Patent Application No. GB 2114027.2 filed on Sep. 30, 2021, the entire disclosures of which are expressly incorporated by reference herein.

FIELD OF THE INVENTION

This invention relates to a sensing circuit for consumer electronic devices such as television receivers, for example television displays and set-top boxes.

BACKGROUND

Consumer electronic devices are generally required to enter a low-power standby and/or off mode after a certain period of user inactivity. The device may then return to full power or operational mode in response to a user or sensor input. The device may be required to draw only very low power during off/standby mode, for example 0.5 W, or 1 W for devices with display, under EU regulation No. 1275/2008.

Hence, there is a need for a low power sensor for such devices, for detecting user presence. One such sensor is a passive infrared (PIR) sensor used to detect a person in proximity to the device. However, such sensors may be sensitive to noise which can lead to false triggers, hence switching on the full power mode of the device and wasting power. False triggers may also be inconvenient for audio-visual devices, which may then cause a disturbance by generating unwanted sound and/or images.

SUMMARY OF THE INVENTION

Aspects of the present invention are set out in the accompanying claims.

According to one embodiment, a consumer electronic device includes a low power sensor arranged to detect proximity of a person, and a controller arranged to modify the operation of the device in response to the low power sensor, for example by switching from standby or off mode to normal or full power mode.

The low power sensor may be a PIR sensor, such as a pyroelectric sensor. The sensor may output a small analogue signal which is supplied to a microcontroller for amplification and digital conversion.

The microcontroller may have an integrated reference voltage supply which is configured to provide an input to an integrated operational amplifier configured to supply power to the sensor. This provides a stable low power supply, thereby reducing noise and false triggering of the sensor. Also, there may be no need to provide an additional power supply for the sensor, so reducing the number of components required and allowing for a low-cost and compact sensing circuit.

BRIEF DESCRIPTION OF THE DRAWINGS

There now follows, by way of example only, a detailed description of embodiments of the present invention, with references to the figures identified below.

DESCRIPTION OF EMBODIMENTS

Figure 1:
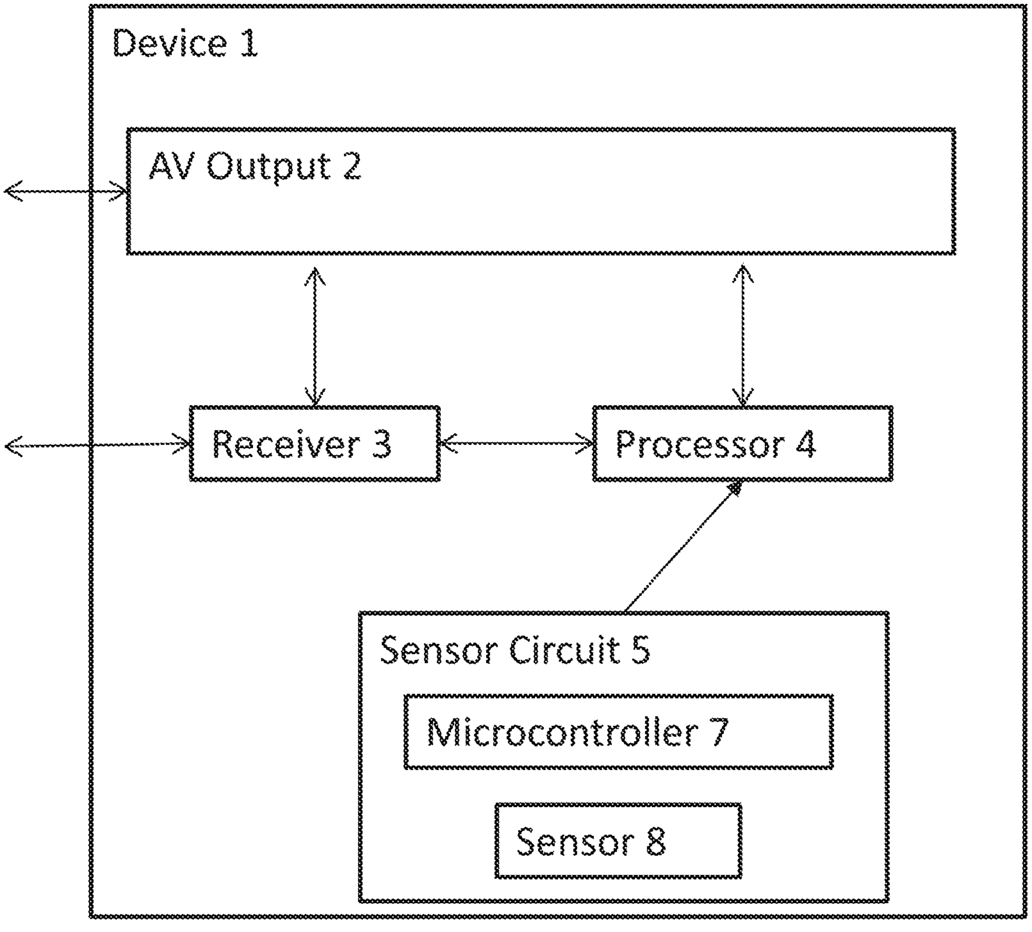
FIG. 1 is a block flow diagram showing a media receiving device including a sensing circuit.
Figure 1:
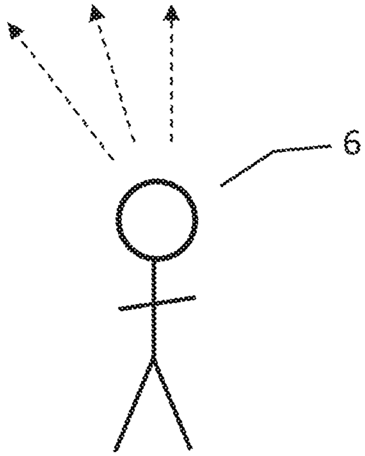

FIG. 1 is a block diagram schematically illustrating a media receiving device 1, such as a TV, set-top box (STB) or streaming receiver device. The device 1 includes a receiver 3, such as a broadcast receiver or media streaming receiver, which receives media content and provides the content to audio-visual (AV) output 2, such as a display screen and speakers in the case of a TV, or an external output such as an HDMI interface in the case of an STB.

A processor 4 controls an operational state of the device 1, for example by putting the device 1 in a low power mode if no user activity is detected for a predetermined length of time, as detected by sensing circuit 5. In the low power mode, the AV output 2 may be switched off or put in a low power mode which reduces the power drawn by the AV output 2. Additionally, the receiver 3 may be put in a low power mode, for example by suspending reception of programmes.

Sensing circuit 5 detects the presence of a user 6 and signals this to the processor 4 so as to wake the device 1 from the low power mode to a normal or full power mode in which the AV output 2 and the receiver 3 are switched on. Alternatively or additionally, the processor 4 may respond to the detection of a user 6 by the sensing circuit 5 to modify operation of the device 1 in other ways, for example to modify the AV output 2, such as by increasing audio volume or display brightness. The processor 4 may respond to the detection of a user 6 by reporting to a remote network node that the programming is being watched, for example for audience measurement.

The sensing circuit 5 comprises a low power sensor 8 and a microcontroller 7, which may be mounted on a PCB (not shown) which provides power, and connection from the microcontroller 7 to the processor 4.

The sensor 8 may be a PIR sensor, such as a pyroelectric sensor. The sensor may output a small analogue signal which is input to a microcontroller for amplification, filtering and digital conversion.

Figure 2:
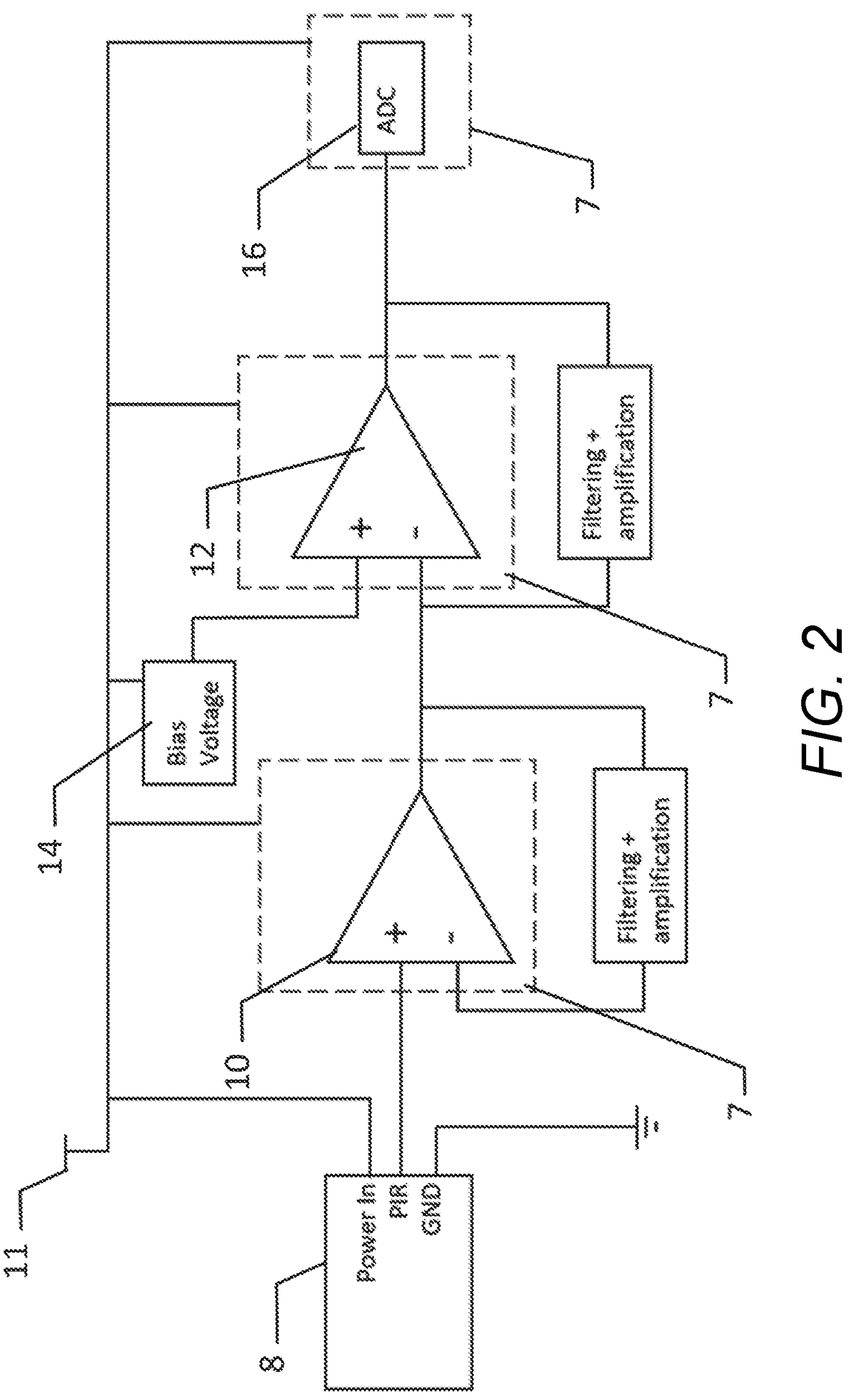
FIG. 2 is schematic circuit diagram of a conventional sensing circuit.
Figure 3:
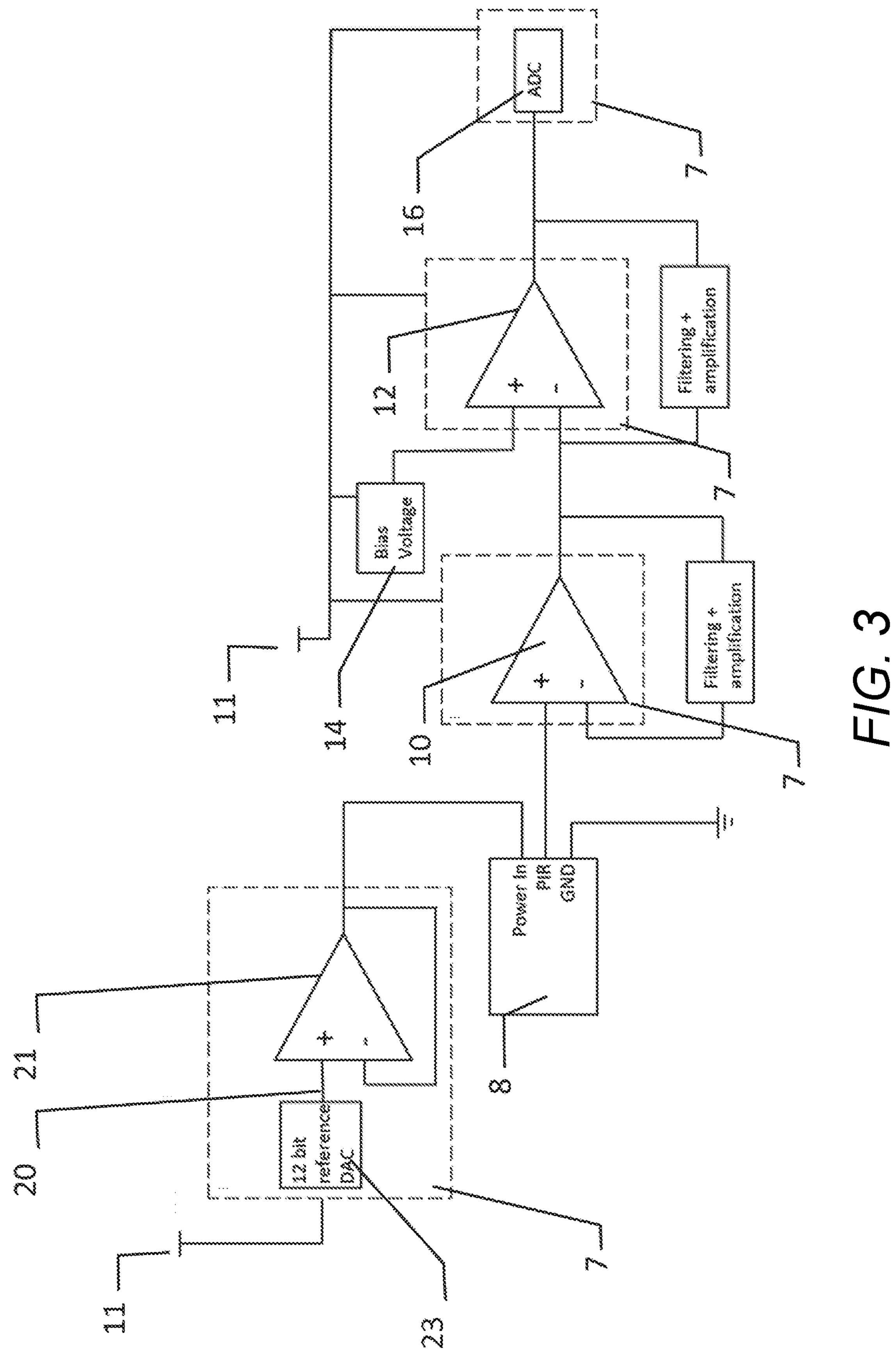
FIG. 3 is a schematic circuit diagram of a sensing circuit in an embodiment of the invention.

FIG. 2 shows a conventional arrangement for connection of the microcontroller 7 to the sensor 8. In FIGS. 2 and 3, components internal to or integrated within the microcontroller 7 are indicated within a dashed box referenced 7.

The sensor 8 receives a power supply voltage (Power In) from a power supply 11 on the PCB, such as a 3.3 V rail, and is connected to ground (GND) via the PCB. The sensor 8 provides an analog output signal (PIR) indicative of the property sensed by the sensor 8, such as changes in passive background infrared. The analog signal output from the PIR sensor is amplified and filtered by a first stage operational amplifier 10 within the microcontroller 7, and then by a second stage operational amplifier 12 within the microcontroller 7, with a DC offset controlled by a bias voltage 14 e.g. from a voltage divider connected to the PCB power supply 11. The resultant amplified and filtered analog signal is then input to an analog-to-digital converter (ADC) 16, which is processed and output as a digital signal, indicative of a motion event detected by the sensor 8, to the processor 4.

One problem with the conventional arrangement shown in FIG. 2 is that the power supply 11 is susceptible to noise, which then affects the analog signal output by the sensor 8. The noise may then affect the digital signal output by the ADC 16, which in turn may lead to false detection of a user 6 by the processor 4, leading to undesired operation of the device 1.

FIG. 3 shows an arrangement for connection of the microcontroller 7 to the sensor 8 in an embodiment of the invention. This arrangement differs from that of FIG. 2 in that a reference voltage supply 20, internal to the microcontroller 7, is configured as an input to an operational amplifier 21, also internal to the microcontroller 7, and the output of the operational amplifier 21 is provided as a power supply to the sensor 8. The reference voltage supply 20 provides a stable reference voltage that is controlled by a reference DAC 23.

Since the sensor 8 is a low power device, such as a pyroelectric sensor, the output of the operational amplifier 21 is sufficient to power the sensor 8. This power supply is less susceptible to noise than the unregulated power supply 11 from the PCB, and does not require additional components. This arrangement provides a simple and reliable sensing circuit suitable for use in a consumer electronics device such as a media receiver.

Figure 4:
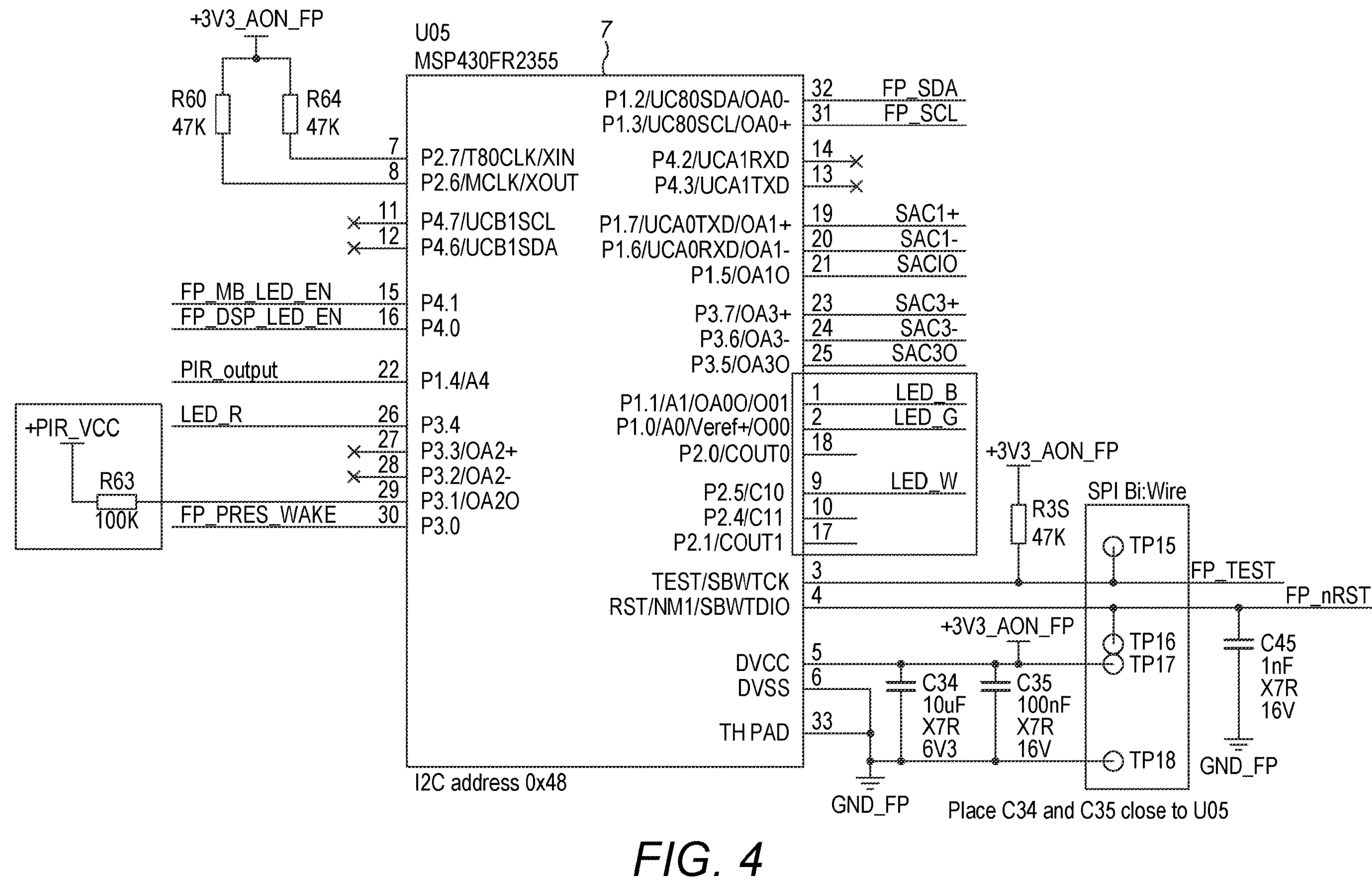
FIG. 4 is a detailed circuit diagram of the pin connections of a microcontroller in one specific embodiment.
Figure 5:
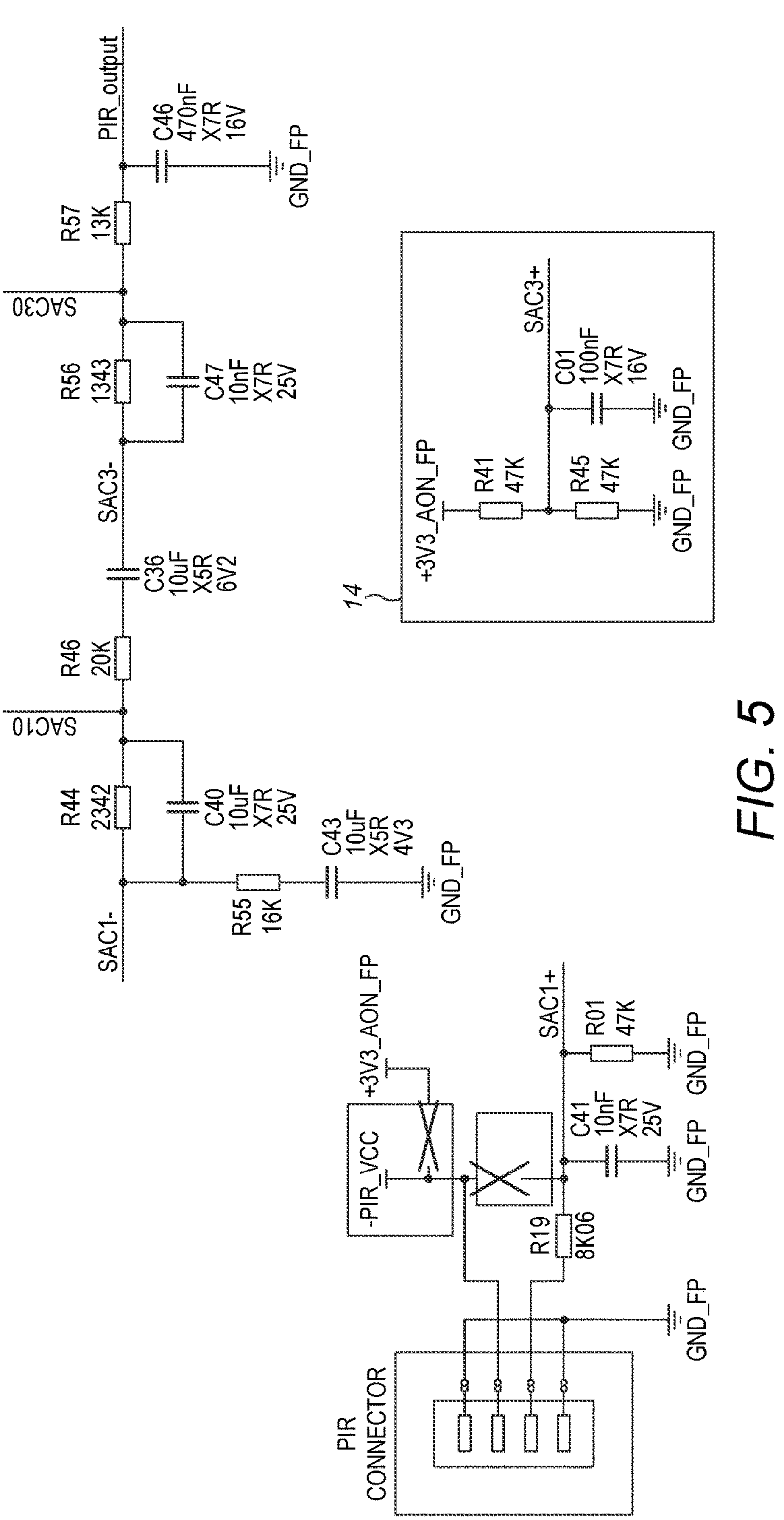
FIG. 5 is a detailed circuit diagram of connections to a sensor in one specific embodiment.

In one specific embodiment, the microcontroller 7 is an MSP430™ microcontroller from Texas Instruments. The sensor 8 is a pyroelectric sensor from KEMET. FIGS. 4 and 5 show circuit diagrams in this specific embodiment. As shown in FIG. 4, pin 29 of the MSP430™ microcontroller is the output of OA2 (operational amplifier 2) and supplies power (+PIR VCC) to the sensor 8. OA2 is configured in follower mode to route the reference voltage of reference DAC 23 out for external use. In this instance, OA1 and OA3 are used for the second order filter circuit. The analog output of the sensor 8 is input to pin 22 of the microcontroller 7, although another analog input pin could be used.

A similar arrangement to the above may be used in other microcontrollers having integrated operational amplifiers.

Alternative embodiments, which may become apparent to the skilled person on reading the above description, may nevertheless fall within the scope of the following claims.

The invention claimed is:

1. A user-sensing circuit for a consumer electronics device, comprising a passive infrared (PIR) sensor and a microcontroller arranged to amplify and digitally convert the output of the sensor, and to provide a power input to the sensor, wherein the microcontroller includes an internal reference voltage source which is routed to an output of the microcontroller to provide the power input to the sensor.

2. User-sensing circuit of claim 1, wherein the internal reference voltage source is configured as an input to an integrated operational amplifier internal to the microcontroller, the output of the operational amplifier being configured to provide the power input to the sensor.

3. User-sensing circuit of claim 1, including a printed circuit board (PCB) having a power supply, wherein the sensor and the microcontroller are mounted on the PCB such that the power supply supplies power to the microcontroller.

4. User-sensing circuit of claim 3, wherein the internal reference voltage source of the microcontroller is powered by the power supply.

5. User-sensing circuit of claim 1, wherein the PIR sensor comprises a pyroelectric sensor.

6. A consumer electronics device including the user-sensing circuit of claim 1.

7. The device of claim 6, arranged to change an operational state thereof in response to the user-sensing circuit.

8. The device of claim 7, arranged to wake from a low power mode to a normal power mode in response to the user-sensing circuit.

9. The device of claim 6, wherein the device comprises a media receiver.

* * * * *